United States Patent [19]
Keicher

[11] 3,915,072

[45] Oct. 28, 1975

[54] SAFETY VALVE

[75] Inventor: Siegfried Keicher, Dellmensingen, Germany

[73] Assignee: Kamag Transporttechnik GmbH & Co., Ulm, Germany

[22] Filed: Apr. 18, 1974

[21] Appl. No.: 462,022

[30] Foreign Application Priority Data
Apr. 18, 1973 Germany............................ 2319611

[52] U.S. Cl. ...................... 92/61; 60/403; 60/582; 137/459; 180/82 R; 280/104.5 R
[51] Int. Cl.² ............................................ F01B 1/00
[58] Field of Search ............. 60/403, 457, 458, 534, 60/535, 582; 91/390; 92/61, 146; 137/456, 459; 180/82 R, 104, 107, 108; 280/104, 104.5 R

[56] References Cited
UNITED STATES PATENTS
2,353,304  7/1944  Green .................................. 60/535
2,914,338  11/1959  Kress .................................. 280/104
2,921,440  1/1960  Feibush ................................ 60/582

Primary Examiner—Edgar W. Geoghegan

[57]  ABSTRACT

A safety device for use in hydraulic equipment against pipe breakage wherein a plurality of hydraulic cylinders are interconnected in groups of conduits, and safety shutoff valves are operatively connected with the conduits, with each of the safety valves having a valve inlet and two valve outlets, and a valve sealing member positioned between the two valve outlets whereby the valve sealing member is displaced to close off one of the valve outlets in response to a current impulse between the two valve outlets. Two of the cylinders are interconnected in parallel through one of the two valve outlets, and the valve inlet is connected to the cylinder.

3 Claims, 4 Drawing Figures

SAFETY VALVE

This invention relates to a safety device against pipe breakage for use with hydraulic supports or suspensions in heavy duty trucks, hydraulic steering transmissions or the like. Such devices include a plurality of hydraulic cylinders, interconnected in groups via conduits, along with safety shutoff valves connected into the conduit system having a valve input and two valve outlets sealable alternately by a joint valve sealing part maintained under the action of a spring in a central position releasing both valve outlets from which position it can be articulated by a current impulse between both valve outlets into the corresponding closing position.

Because the carrying capacity of individual wheels, wheel sets and axles is limited, heavy duty trucks frequently are designed with a large number of separately supported wheel sets. It is generally desirable to hydraulically support the individual wheel sets whereby they are interconnected in groups via a pipe conduit system. This assures that the wheel sets can adjust to the unevennesses in the terrain, whereby the axle loads are compensated against each other. To achieve a stable position of the frame of the vehicle, at least three, and usually four groups of hydraulically supported wheel sets are formed, whereby a hydraulic connection exists within each individual group.

If in one of these pipe conduit systems a pipe breaks, there is danger that the vehicle may sag down on one side, that the load may slide off or that the truck will tip over.

Safety means against broken pipes are known from the prior art. They operate according to the principle that a conduit connected to a hydraulic cylinder is sealed by a valve, as soon as the quantity of fluid flowing through this conduit exceeds a predetermined value. If a pipe conduit bursts and the pressure medium flows out at a high speed, the valve body of the pipe bursting valve is carried along and seals the conduit.

In a pipe breakage safety device according to the prior art comprising a safety blocking valve (German patent specification No. 1,750,053) of the type described, part of the defective conduit system is disconnected. For example, in a hydraulic brake system of a vehicle or aircraft, the conduit leading to one or several wheels is disconnected, while the other wheels can be braked.

However, such a pipe breakage safety device is unsuitable for the contemplated range of application because the seal of the broken pipe conduit will cause the hydraulic support, at least of the involved wheel set, to become rigid. If the wheel set subsequently moves over an elevation in the ground, the load which should be distributed over numerous wheel sets now acts exclusively on the rigidly supported wheel set which may be destroyed under this overload. Such situations occur particularly when hauling very heavy loads and lead to considerable danger in operation. Even in the case of hydraulic steering systems or the like, it is impossible to forego the operating ability of the individual cylinders; similar considerations apply in a braking system.

Moreoever, the customary safety means against pipe breakage is also unsuitable for the area of application shown because, when negotiating uneven spots in the terrain, rapid movements of the individual wheel sets take place leading to short-lived high flows in the pipe conduits. Already these peaks of currents can cause a response of the locking valve in a branch of a conduit.

It is accordingly an object of the present invention to provide a safety device which overcomes the foregoing disadvantages, and it is a more specific object of this invention to provide a safety valve for use with hydraulic systems in which failure in a conduit of the system does not render inoperative the entire hydraulic system, and yet prevents the escape of hydraulic fluid from the system.

Other objects and advantages of the invention will appear more fully hereinafter and for purposes of illustration, but not of limitation, embodiments of the invention are shown in the accompanying drawings in which.

Figure 1:
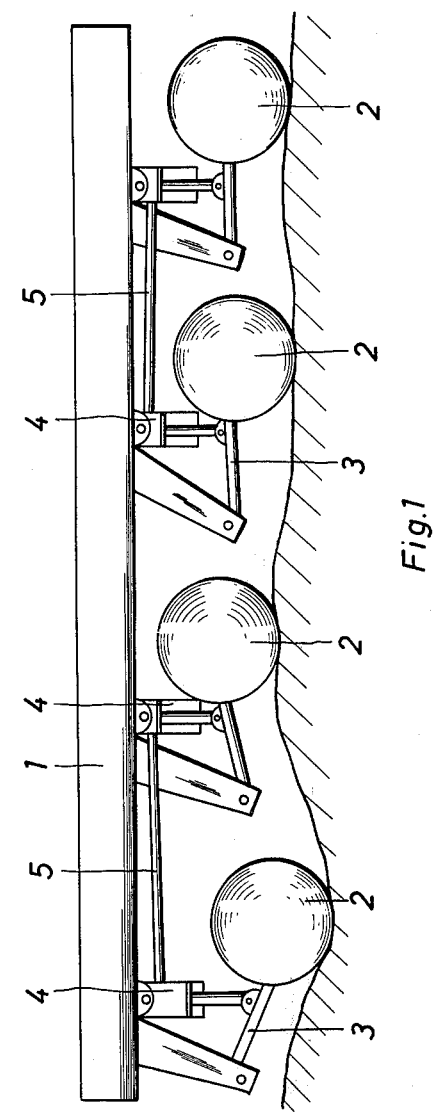
FIG. 1 is a schematic illustration of a hydraulically supported vehicle not provided with a safety device against pipe breakage.

The invention is addressed to the problem of providing a safety device against pipe breakage of the described type wherein in fact a broken pipe conduit is at once sealed with regard to the associated cylinders, but in which a hydraulic connection of all cylinders of one group remains operative in order to maintain the operating capability of all cylinders.

This problem is solved according to the invention in that in each case two hydraulic cylinders are interconnected by two separate conduits connected in parallel, and that both conduits are connected to each cylinder in each case to one of the two outlets of a safety locking valve, whose input is connected to the cylinder.

If a break occurs in one of the two conduit systems, the valve sealing parts of the connected hydraulic cylinders seal, under the effect of the occurring current impulse between both conduit systems, the valve outlet at once, which leads to the conduit system showing the drop of pressure. This prevents almost completely the discharge of pressure medium. At the same time, however, an operable connection of the individual hydraulic cylinders remains operative via the second conduit system, so that the cylinders remain operable; for example, an equalization as to height of the wheel sets can be accomplished from then on continuously. Because the valve sealing part is deflected from its central position only under the presence of a current impulse, particularly in case of a difference in pressure between both conduit systems, sudden high peaks of current, the like of which take place when rapidly driving over an obstacle on the road surface, cannot cause the safety device for pipe breaks to respond, because the forces being generated evenly impinge the valve sealing part in both directions.

Under a further improvement of the concepts of the invention, it is contemplated to design the valve sealing part as a double sealing cone, in whose central position the pressure medium flows around it with a narrowing of the passage crosssection, said medium flowing between the valve input and the two outlets. Thus the valve sealing part represents at the same time the building component which scans the pressure differences leading to current impulses between both separate conduit systems and converts them into an actuation of the valve.

Appropriately, both sealing cones of the valve sealing part are designed in each case as a piston having passage recesses at its circumference, whereby the area between both pistons is connected to the valve inlet and the area located on the other side of the piston is connected with one valve outlet. The valve sealing part responds very rapidly, even to minor impulses, particularly variations in pressure, as they have a relatively large effective area at the valve sealing part. The result is that even at minor leakage openings, an immediate shutoff of the affected conduit system is accomplished, before a larger quantity of pressure fluid can discharge.

Having described the basic concepts of the invention, reference is now made to the accompanying drawing for a more detailed description of the invention.

The vehicle frame 1 of a heavy duty vehicle indicated schematically in FIG. 1, for example, for hauling sections of ships or similar heavy loads, is provided with a large number of wheel sets 2, which in each case are individually suspended at rockers 3 and supported via hydraulic cylinders 4 at the vehicle frame 1. The individual hydraulic cylinders are interconnected in groups by pipe conduits 5 so that the axial loads can be compensated among each other.

If, in case of a vehicle without pipe breakage safety device, as shown in FIG. 1, a break occurs in a conduit 5, the supporting effect of all hydraulic cylinders connected to said conduit 5 stops, so that the vehicle frame 1 sags unilaterally; a load placed on the vehicle frame 1 can slide off or tip over.

Figure 2:
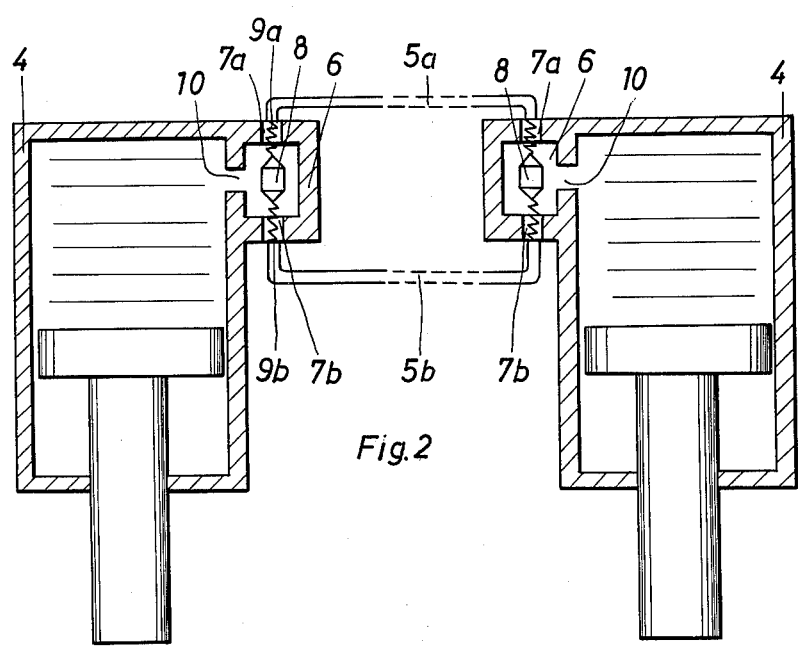
FIG. 2 is a schematic illustration of the valve system embodying the features of the present invention.

FIG. 2 shows the connection according to the invention of two supporting cylinders 4 via two conduit systems 5a and 5b, embodying the features of the invention. As illustrated in FIG. 2, both conduit systems 5a and 5b are shown in each case as simple pipe conduits, connected in parallel and connected to each cylinder 4 under the interposition of the safety shutoff valve 6. Each valve is provided with two valve outlets 7a and 7b, connected to the conduit systems 5a and 5b respectively. A valve sealing part 8 is maintained between both valve outlets 7a and 7b in a central position by springs 9a, 9b. A valve inlet 10 is connected to the hydraulic cylinder 4. The valve shutoff part 8 is so arranged that pressure medium flows about it; the latter flows between the valve inlet 10 and both valve outlets 7a and 7b.

If a pipe should burst in one of the two pipe conduits 5a or 5b, the valve shutoff part 8 is moved by the pressure differential and current impulse taking place out of its central position in such a manner that it seals the valve outlet 7a or 7b, which leads to the broken pipe conduit 5a or 5b. The other pipe conduit remains in operating condition in each case, so that an equalization of the altitude of the connected wheel sets 2 continues to be feasible. A sinking of the load is prevented because the broken pipe conduit is sealed immediately.

In order to further increase the operating safety, both pipe conduit systems 5a and 5b may in each case be equipped with a pressure switch (not shown), which furnishes an indicating signal, as soon as a conduit system is without pressure, and thus defective. In this way, continued use of a vehicle with a broken pipe or conduit is prevented eventhough the broken pipe is not readily observable from an inspection of the vehicle.

Figure 3:
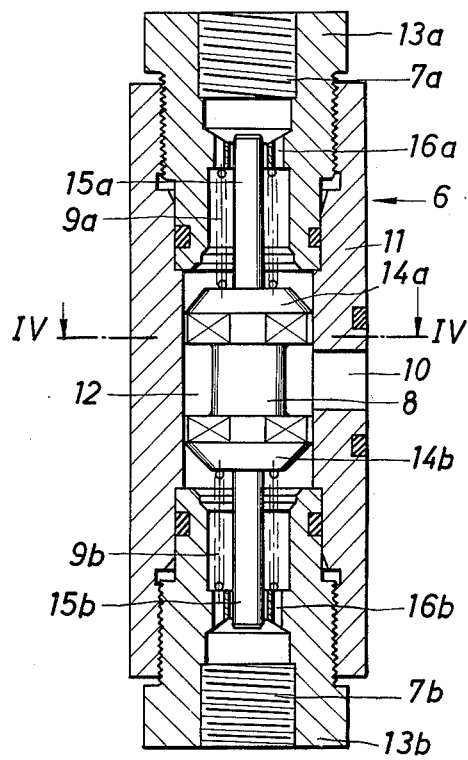
FIG. 3 is a longitudinal sectional view through a safety valve embodying the features of this invention.
Figure 4:
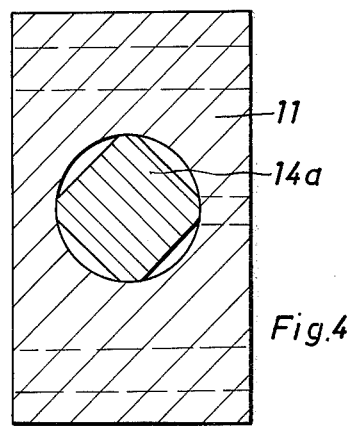
FIG. 4 is a sectional view taken along the lines IV-IV of FIG. 3.

FIGS. 3 and 4 show details of a safety shutoff valve 6 shown in a simplified or schematic manner in FIG. 2. The valve 6 is provided with a housing 11 having a cylindrical perforation 12 connected via the valve input 10 to one of the hydraulic cylinders 4. Connecting parts 13a, 13b for connecting the pipe conduits 5a, 5b are screwed in at both ends of the perforation 12. At the same time they form the two valve outlets 7a and 7b.

The valve sealing part 8 is arranged movably in the valve perforation 12; said valve sealing part 8 is provided with two pistons 14a, 14b connected by a thin intermediate part and provided at their surfaces facing away from each other with valve cones fitting upon corresponding cone seats at the connecting parts 13a, 13b. Guide pins 15a, 15b are formed at both ends of the valve sealing part 8 and sliding in the connecting parts 13a, 13b. The valve springs 9a, 9b, designed as spiral springs, are seated on the connecting parts 13a, 13b and maintain the valve sealing part 8 in a central position. A crown of perforations 16a, 16b surrounds the guide opening for the pins 15a, 15b they are used for the passage of the pressure medium.

As can be seen from the sectional view of FIG. 4, the circumference of both pistons 14a, 14b is flattened at four sides so that narrow passage slots are provided for the pressure medium.

With both conduit systems 5a, 5b intact, the same pressure exists at both outer surfaces of the pistons 14a, 14b so that the valve sealing part 8 maintains its central position between both pistons 14a and 14b, unchanged even in case of major pressure fluctuations in the central section of perforation 12. However, as soon as the pressure drops in one of the two conduits 5a, 5b, the unequal pressure forces shift the valve sealing part toward that side where the drop of pressure took place so that the affected valve outlet 7a and/or 7b is sealed.

The invention has been described on the basis of a hydraulic driving gear support; it goes without saying, however, that a pneumatic driving gear support can be secured against broken pipe conduits using the features of the invention. The cone valve shown also can be replaced by other valve construction forms, piston valves, plate valves, or ball seat valves, for example. The constricted passage apertures for the pressure medium can be executed in a modified form, for example, as perforations in the valve pistons 14a, 14b.

It will be understood that various changes and modifications can be made in the details of construction, operation and use without departing from the spirit of the invention, especially as defined by the following claims.

I claim:

1. In a safety device against pipe breakage in hydraulic equipment including a pair of hydraulic cylinders interconnected by conduit means and a pair of safety shut-off valve operatively connected with the conduit means, the improvement comprising safety shut-off valves having a valve inlet and two valve outlets, with the valve inlet of each valve being operatively connected with each cylinder, said valves including a valve sealing member positioned between the two valve outlets and spring means to position the valve sealing member between the two valve outlets whereby the valve sealing member is displaced against the spring means to close off one of the valve outlets in response to a current impulse between the two valve outlets, with two of the cylinders being interconnected in parallel through one of the two valve outlets of said valve, and the valve inlet is connected to the cylinder.

2. A safety device against pipe breakage according to claim 1 wherein the valve sealing member is a double sealing cone, in whose central position the pressure medium flows around it with a narrowing of the passage cross-section, said medium flowing between the valve input and the two valve outlets.

3. A safety device against pipe breakage according to claim 1 wherein both sealing cones of the valve sealing member are pistons provided with passage recesses at their circumferences, whereby the area between both pistons is connected with the valve inlet and the area located on the other side of the piston is connected to one valve outlet.

* * * * *

UNITED STATES PATENT OFFICE
CERTIFICATE OF CORRECTION

Patent No. 3,915,072   Dated October 28, 1975

Inventor(s) Siegfried Keicher

It is certified that error appears in the above-identified patent and that said Letters Patent are hereby corrected as shown below:

IN THE SPECIFICATION

In column 3, line 26, after "the", please insert the following: -- wheel sets 2 can adjust to unevennesses in the terrain and so that the -- .

Signed and Sealed this ninth Day of March 1976

[SEAL]

Attest:

RUTH C. MASON  
Attesting Officer

C. MARSHALL DANN  
Commissioner of Patents and Trademarks